United States Patent
Jiang et al.

(10) Patent No.: US 12,267,782 B2
(45) Date of Patent: Apr. 1, 2025

(54) PROCESSING METHOD AND DEVICE

(71) Applicant: VIVO MOBILE COMMUNICATION CO., LTD., Guangdong (CN)

(72) Inventors: Dajie Jiang, Guangdong (CN); Xueming Pan, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 257 days.

(21) Appl. No.: 17/686,564

(22) Filed: Mar. 4, 2022

(65) Prior Publication Data
US 2022/0191797 A1    Jun. 16, 2022

Related U.S. Application Data

(63) Continuation of application No. PCT/CN2020/105214, filed on Jul. 28, 2020.

(30) Foreign Application Priority Data

Sep. 6, 2019   (CN) .......................... 201910844605.1

(51) Int. Cl.
*H04W 72/04* (2023.01)
*H04L 5/00* (2006.01)
*H04W 52/02* (2009.01)
*H04W 72/23* (2023.01)
*H04W 72/542* (2023.01)

(52) U.S. Cl.
CPC ....... *H04W 52/0235* (2013.01); *H04L 5/0048* (2013.01); *H04W 52/0232* (2013.01); *H04W 72/23* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2018/0069612 | A1 | 3/2018 | Yum et al. |
| 2019/0254110 | A1 | 8/2019 | He et al. |
| 2020/0029315 | A1* | 1/2020 | Lin ........................ H04W 24/08 |
| 2020/0412430 | A1 | 12/2020 | Song et al. |
| 2021/0306952 | A1 | 9/2021 | Kuang et al. |

(Continued)

FOREIGN PATENT DOCUMENTS

| | | |
|---|---|---|
| CN | 104641677 A | 5/2015 |
| CN | 107466452 A | 12/2017 |

(Continued)

OTHER PUBLICATIONS

Spreadtrum Communications, "Wakeup signaling in DRX", 3GPP TSG-RAN WG2 Meeting #107, R2-1909085, Prague, Czech Republic, Aug. 26-30, 2019.

(Continued)

*Primary Examiner* — Gary Lafontant
(74) *Attorney, Agent, or Firm* — Price Heneveld LLP

(57) ABSTRACT

Embodiments of this disclosure provide a processing method and a device. The method includes: obtaining a report configuration of first channel state information, and if a terminal is not indicated to monitor a physical downlink control channel within onduration, reporting channel state information based on the report configuration of the first channel state information.

12 Claims, 8 Drawing Sheets

(56) References Cited

U.S. PATENT DOCUMENTS

| | | | |
|---|---|---|---|
| 2021/0360532 A1 | 11/2021 | Jiang et al. | |
| 2022/0174602 A1* | 6/2022 | Zhang | ............... H04W 52/0235 |

FOREIGN PATENT DOCUMENTS

| | | | |
|---|---|---|---|
| CN | 109219116 A | 1/2019 | |
| CN | 109644356 A | 4/2019 | |
| CN | 110167062 A | 8/2019 | |
| CN | 110167128 A | 8/2019 | |
| CN | 111432460 A | 7/2020 | |
| CN | 111436103 A | 7/2020 | |
| EP | 3826369 A1 | 5/2019 | |
| WO | 2017018445 A1 | 2/2017 | |

OTHER PUBLICATIONS

Vivo, "C-DRX enhancement for power saving with WUS", 3GPP TSG-RAN WG2 Meeting #105bis, R2-1903199, Xi'an, China, Apr. 8-12, 2019.

MTI, "CSI Reporting in C-DRX", 3GPP TSG-RAN WG2 #102, R2-1807688, Busan, Korea, May 21-25, 2018.

Vivo, "Discussion on CSI/SRS reporting in UE power saving", 3GPP TSG RAN WG1 #99, R1-1911996, Reno, USA, Nov. 18-22, 2019.

CATT, "Offline Discussion Summary of PDCCH-based Power Saving Signal/Channel", 3GPP TSG RAN WG1 Meeting #98, R1-1909799, Prague, CZ, Aug. 26-30, 2019.

CATT, "PDCCH-Based Power Saving Signal/Channel", 3GPP TSG RAN WG1 Meeting #97, R1-1906350, Reno, USA, May 13-17, 2019.

Ericsson, 3GPP TSG RAN meeting #84, RP-191355, Newport Beach, USA, Jun. 3-6, 2019.

CMCC, Discussion on PDCCH-based power saving signal/channel design, 3GPP TSG RAN WG1 #98, R1-1908871, Aug. 26-30, 2019, Prague, CZ.

Qualcomm Incorporated, "UE Adaptation to the Traffic and UE Power Consumption Characteristics", 3GPP TSG-RAN WG1 Ad-Hoc Meeting 1901, R1-1900911, Taipei, Taiwan, Jan. 21-25, 2019.

* cited by examiner

PROCESSING METHOD AND DEVICE

CROSS-REFERENCE TO RELATED APPLICATIONS

The present application is a bypass continuation application of International Application No. PCT/CN2020/105214 filed on Jul. 28, 2020, which claims priority to Chinese Patent Application No. 201910844605.1, filed in China on Sep. 6, 2019, which are incorporated herein by reference in their entireties.

TECHNICAL FIELD

Embodiments of this disclosure relate to the field of communication technologies, and specifically, to a processing method and a device.

BACKGROUND

If a power saving signal received by a terminal indicates the terminal to perform detection on a physical downlink control channel (PDCCH) within an onduration timer, the terminal starts the onduration timer. Otherwise, the terminal skips the onduration timer. Therefore, if no service is available for a long time, the terminal keeps skipping the onduration timer (because it does not need to monitor the PDCCH) and channel state information reporting (including reporting of channel quality indicator (CQI) and beam-related information) cannot be performed. However, if no channel state information reporting is performed for a long time, a beam management process is affected, which may lead to a terminal beam or link failure.

SUMMARY

An objective of embodiments of this disclosure is to provide a processing method and a device.

According to a first aspect, a processing method is provided, applied to a terminal and including:
 obtaining a report configuration of first channel state information; and
 if the terminal is not indicated to monitor a physical downlink control channel within onduration, reporting channel state information based on the report configuration of the first channel state information.

According to a second aspect, an embodiment of this disclosure further provides a processing method, applied to a network device and including:
 sending first signaling or an association rule between a report configuration of first channel state information and a report configuration of second channel state information, where
 the first signaling indicates the report configuration of the first channel state information configured by a network side, and the report configuration of the first channel state information is used for reporting channel state information when a terminal is not indicated to monitor a physical downlink control channel within onduration.

According to a third aspect, an embodiment of this disclosure further provides a processing method, applied to a terminal and including:
 receiving a power saving signal, where the power saving signal indicates any one of the following: the terminal is to perform channel state information reporting and not to perform physical downlink control channel monitoring; the terminal is to perform channel state information reporting and physical downlink control channel monitoring; the terminal is not to perform channel state information reporting and is to perform physical downlink control channel monitoring; and the terminal is not to perform channel state information reporting or physical downlink control channel monitoring; and
 determining, based on the power saving signal, to perform or not to perform one or more of the following: channel state information reporting; and physical downlink control channel monitoring.

According to a fourth aspect, an embodiment of this disclosure further provides a processing method, applied to a network device and including:
 sending a power saving signal, where the power saving signal indicates any one of the following: a terminal is to perform channel state information reporting and not to perform physical downlink control channel monitoring; the terminal is to perform channel state information reporting and physical downlink control channel monitoring; the terminal is not to perform channel state information reporting and is to perform physical downlink control channel monitoring; and the terminal is not to perform channel state information reporting or physical downlink control channel monitoring.

According to a fifth aspect, an embodiment of this disclosure further provides a terminal, including:
 an obtaining module, configured to obtain a report configuration of first channel state information; and
 a first reporting module, configured to, if the terminal is not indicated to monitor a physical downlink control channel within onduration, report channel state information based on the report configuration of the first channel state information.

According to a sixth aspect, an embodiment of this disclosure further provides a network device, including:
 a first sending module, configured to send first signaling or an association rule between a report configuration of first channel state information and a report configuration of second channel state information, where
 the first signaling indicates the report configuration of the first channel state information configured by a network side, and the report configuration of the first channel state information is used for reporting channel state information when a terminal is not indicated to monitor a physical downlink control channel within onduration.

According to a seventh aspect, an embodiment of this disclosure further provides a terminal, including:
 a second receiving module, configured to receive a power saving signal, where the power saving signal indicates any one of the following: the terminal is to perform channel state information reporting and not to perform physical downlink control channel monitoring; the terminal is to perform channel state information reporting and physical downlink control channel monitoring; the terminal is not to perform channel state information reporting and is to perform physical downlink control channel monitoring; and the terminal is not to perform channel state information reporting or physical downlink control channel monitoring; and
 a processing module, configured to determine, based on the power saving signal, to perform or not to perform one or more of the following: channel state information reporting; and physical downlink control channel monitoring.

According to an eighth aspect, an embodiment of this disclosure further provides a network device, including:

a second sending module, configured to send a power saving signal, where the power saving signal indicates any one of the following: a terminal is to perform channel state information reporting and not to perform physical downlink control channel monitoring; the terminal is to perform channel state information reporting and physical downlink control channel monitoring; the terminal is not to perform channel state information reporting and is to perform physical downlink control channel monitoring; and the terminal is not to perform channel state information reporting or physical downlink control channel monitoring.

According to a ninth aspect, an embodiment of this disclosure further provides a terminal, including a processor, a memory, and a program stored in the memory and capable of running on the processor, where when the program is executed by the processor, the steps of the processing method according to the first aspect or the steps of the processing method according to the third aspect are implemented.

According to a tenth aspect, an embodiment of this disclosure further provides a network device, including a processor, a memory, and a program stored in the memory and capable of running on the processor, where when the program is executed by the processor, the steps of the processing method according to the second aspect or the steps of the processing method according to the fourth aspect are implemented.

According to an eleventh aspect, an embodiment of this disclosure further provides a computer-readable storage medium, where a computer program is stored in the computer-readable storage medium, and when the computer program is executed by a processor, the steps of the foregoing processing method are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings.

DESCRIPTION OF EMBODIMENTS

For ease of understanding the embodiments of this disclosure, the following describes several technical points.
(1) Power Saving Signal in RRC Connected State.

Within a connected mode discontinuous reception (CDRX) cycle in radio resource control (RRC) connected state, before onduration, a base station may transmit a power saving signal to a terminal (for example, user equipment (UE)) or a group of UEs, and the UE or UEs perform detection for the power saving signal at a corresponding moment.

Figure 1:
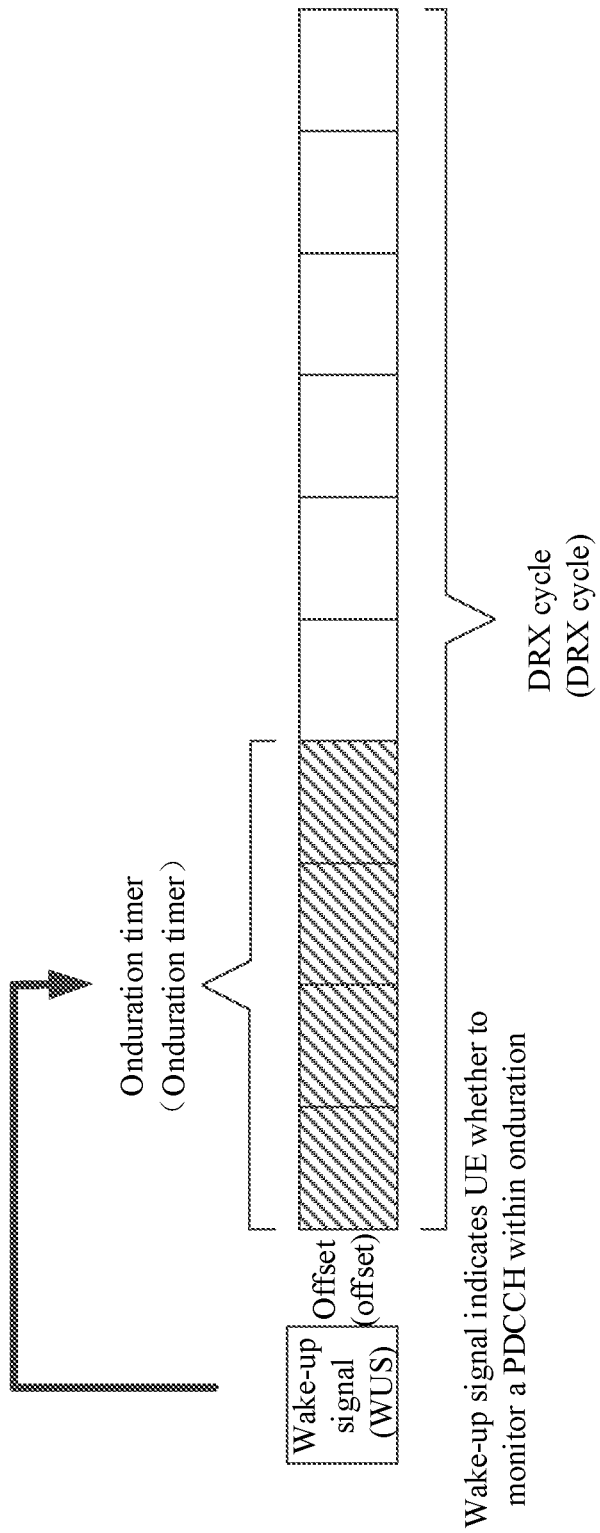
FIG. 1 is a schematic diagram of a CDRX wake-up signal.

Referring to FIG. 1, if UE receives a power saving signal and the power saving signal indicates the UE to perform detection on a physical downlink control channel (PDCCH) within an onduration or indicates the UE to wake up, the UE performs detection on the PDCCH or starts an onduration timer. Otherwise, the UE does not perform detection on the PDCCH or skips (does not start) the onduration timer.

At present, channel state information reporting (CSI report) can be performed only within CDRX active time (for example, after the onduration timer is started). The UE cannot perform channel state information reporting outside the active time (for example, when the onduration timer is not started).

The power saving signal can control the onduration timer. That is, if the power saving signal received by the UE indicates the UE to perform detection on the PDCCH within the onduration timer, the UE starts the onduration timer; otherwise, the UE skips the onduration timer.

Therefore, if no service is available for a long time, the UE keeps skipping the onduration timer (because it does not need to monitor the PDCCH) and channel state information reporting (including reporting of channel quality indicator and beam-related information) cannot be performed.

However, if channel state information reporting cannot be performed for a long time, a beam management process is affected, which may lead to a UE beam or link failure.
(2) Discontinuous Reception (DRX) in RRC Idle (RRC_IDLE) State.

In a long term evolution (LTE) or fifth generation (5G) communications system, UE in an RRC_IDLE state needs to perform, at preconfigured time, detection for a paging signal sent by a base station. A process of performing detection for the paging signal is as follows:

Perform blind detection for a PDCCH corresponding to a paging radio network temporary identity (P-RNTI), and if the PDCCH is not detected, end the detection; or if the PDCCH is detected, further perform detection for a physical downlink shared channel (PDSCH) indicated by the PDCCH, and if the detected PDSCH is not the paging signal of the UE, end the detection; otherwise, the detected PDSCH is the paging signal of the UE.

The UE in the RRC_IDLE state regularly performs detection for the paging signal, but a probability of receiving the paging signal of the UE is low. Power consumption for each PDCCH and PDSCH detection is high, which is not conductive to power saving for the terminal.

(3) DRX in RRC Connected State.

A basic mechanism of DRX is to configure a DRX cycle for UE in an RRC_CONNECTED state. The DRX cycle includes onduration and an opportunity for DRX. During the onduration, the UE monitors and receives a PDCCH (active time). During the opportunity for DRX, the UE does not receive data of a downlink channel, so as to reduce power consumption (sleeping time).

Figure 2:
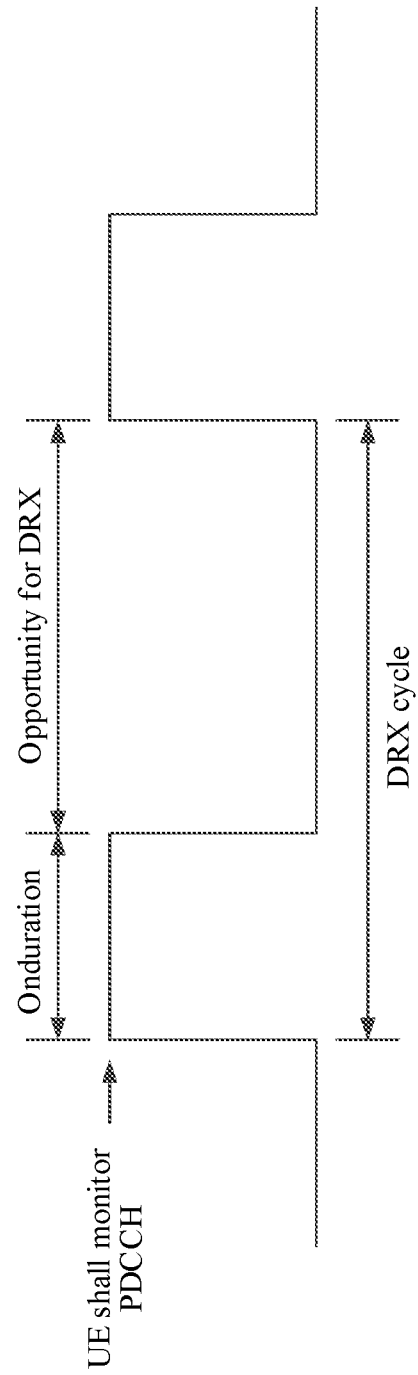
FIG. 2 is a schematic diagram of a DRX cycle.

It can be seen from FIG. 2 that in time domain, time is divided into continuous DRX cycles.

drxStartOffset specifies a start subframe of a DRX cycle and longDRX-Cycle specifies how many subframes a long DRX cycle occupies. These two parameters are determined by a longDRX-CycleStartOffset field. onDurationTimer specifies the number of continuous subframes, starting from the start subframe of the DRX cycle, in which a PDCCH needs to be monitored (that is, the number of continuous subframes within the onduration).

In most cases, after UE is scheduled and receives or sends data in a subframe, the UE is much likely to be still scheduled in subsequent several subframes. If the UE waits to receive or send the data till a next DRX cycle, an additional latency is caused. To reduce such latency, the UE remains in the onduration after being scheduled, that is, the UE keeps monitoring the PDCCH within the configured onduration. The implementation mechanism is as follows: Each time when the UE is scheduled to initially transmit data, the UE starts (or restarts) a timer (drx-InactivityTimer). The UE remains in an active state until the timer expires. drx-InactivityTimer specifies the number of continuous subframes in which the UE remains in the active state after the UE successfully decodes a PDCCH that indicates initially transmitted uplink (UL) or downlink (DL) user data. That is, each time when the UE is scheduled and initially transmits data, the timer is restarted.

To further reduce power consumption for blind detection of a paging signal or PDCCH in the foregoing two types of DRX, concepts of wake-up signal (WUS) and sleep signal (collectively referred to as power saving signal) are proposed.

(4) Power Saving Signal in RRC_IDLE or RRC Inactive (RRC_Inactive) State.

Within each paging cycle in idle state, before a paging occasion (PO), a base station transmits a power saving signal to UE, and the UE performs detection for the power saving signal at a corresponding moment.

If the power saving signal indicates the UE to perform detection for a PDCCH at the PO, the UE performs detection for the PDCCH.

If the power saving signal does not indicate the UE to perform detection for the PDCCH at the PO, the UE does not perform detection for the PDCCH.

Optionally, performing detection for the power saving signal is less complex and more power-saving than performing blind detection for the paging signal or PDCCH.

The power saving signal may be a signal similar to a PDCCH, or may be a sequence-related signal such as a channel state indication-reference signal (CSI-RS) or an on-off keying (OOK) signal.

The following clearly and completely describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the terms "including", and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, terms such as "an example" or "for example" are used to represent giving an example, an instance, or an illustration. Any embodiment or design solution described as "an example" or "for example" in the embodiments of this disclosure shall not be interpreted as being more preferred or advantageous than other embodiments or design solutions. Specifically, the terms such as "an example" or "for example" are intended to present related concepts in a specific manner.

The technologies described herein are not limited to a long term evolution (LTE)/LTE-Advanced (LTE-A) system, and are also applicable to various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system may implement radio technologies such as CDMA2000 and universal terrestrial radio access (UTRA). UTRA includes wideband CDMA (Wideband Code Division Multiple AccessWCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). Techniques described in this specification may be used in the aforementioned systems and radio technologies, and can also be used in other systems and radio technologies.

Figure 3:
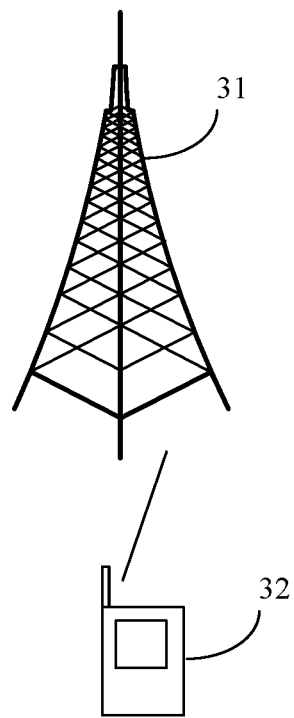
FIG. 3 is a schematic architectural diagram of a wireless communications system according to an embodiment of this disclosure.

The following describes the embodiments of this disclosure with reference to the accompanying drawings. A processing method and a device provided in the embodiments of this disclosure may be applied to a wireless communications system. FIG. 3 is a schematic architectural diagram of a wireless communications system according to an embodiment of this disclosure. As shown in FIG. 3, the wireless communications system may include a network device 31 and a terminal 32. The terminal 32 may be denoted as UE 32. The terminal 32 may perform communication (signaling transmission or data transmission) with the network device 31. In practical applications, connection between the foregoing devices may be a wireless connection. For ease of visually representing the connection relationship between the devices, a solid line is used to indicate that in FIG. 3.

The network device 31 provided in this embodiment of this disclosure may be a base station. The base station may be a commonly used base station or an evolved node base station (eNB), or may be a network device in a 5G system (for example, a next generation node base station (gNB) or a transmission and reception point (TRP)), or the like.

The terminal 32 provided in this embodiment of this disclosure may be a mobile phone, a tablet computer, a notebook computer, an ultra-mobile personal computer (UMPC), a netbook, a personal digital assistant (PDA), a mobile internet device (MID), a wearable device, a vehicle-mounted device, or the like.

Figure 4:
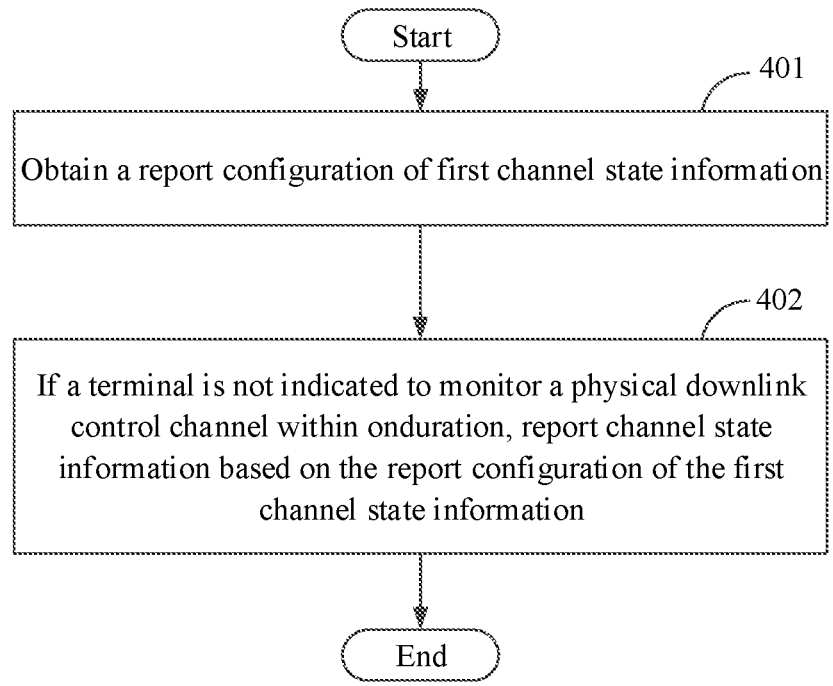
FIG. 4 is a first flowchart of a processing method according to an embodiment of this disclosure.

Referring to FIG. 4, an embodiment of this disclosure provides a processing method. The method is executed by a terminal and includes step 401 and step 402.

Step 401: Obtain a report configuration of first channel state information.

Optionally, the report configuration of the first channel state information may be obtained in the following two manners:

Based on explicit indication: First signaling is received, where the first signaling indicates the report configuration of the first channel state information configured by a network side, and the report configuration of the first channel state information indicates that a first channel state information report time is outside connected mode discontinuous reception active time.

Based on implicit indication: The report configuration of the first channel state information is determined based on a report configuration of second channel state information and an association rule, where the association rule represents a correspondence relationship between the report configuration of the first channel state information and the report configuration of the second channel state information, and the association rule is defined by a protocol or configured by the network side.

The association rule includes one or more of the following: (1) a report cycle of the first channel state information is N times a report cycle of the second channel state information, where N is a positive integer; and (2) a report quantity type of the first channel state information. For example, the terminal may skip some unimportant channel state information report quantities. For example, the terminal may skip a channel state information report quantity other than reference signal received power of a channel state information reference signal resource indicator (CRI-RSRP) and reference signal received power of a synchronization signal and PBCH block (ssb-Index-RSRP).

Step 402: If the terminal is not indicated to monitor a physical downlink control channel within onduration, report channel state information based on the report configuration of the first channel state information.

Figure 14:
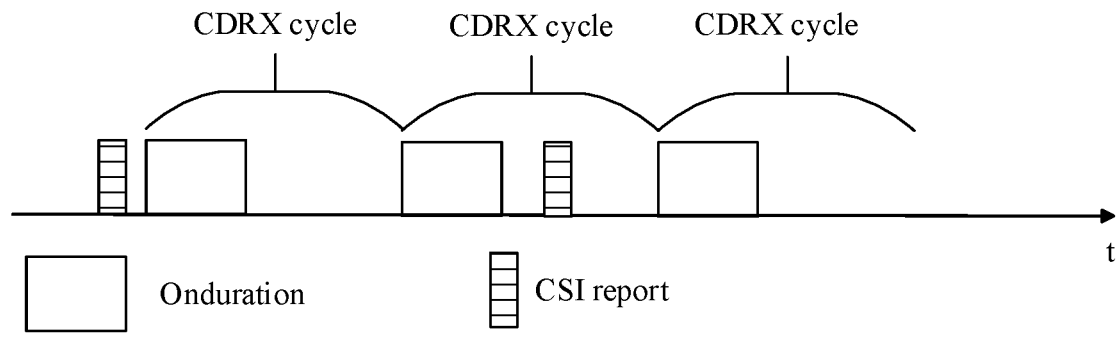
FIG. 14 is a first schematic diagram of CSI report time according to an embodiment of this disclosure.

In some implementations, step 402 may include: if report time of the report configuration of the first channel state information is outside the connected mode discontinuous reception active time, reporting the channel state information based on the report configuration of the first channel state information. As shown in FIG. 14, the report time of the report configuration of the first channel state information is outside the onduration.

In some implementations, the method shown in FIG. 4 may further include: receiving the report configuration of the second channel state information configured by the network side; and if the terminal is indicated to monitor a physical downlink control channel within onduration, reporting the channel state information based on the report configuration of the second channel state information. That the terminal is not indicated to monitor the physical downlink control channel within the onduration specifically means: the terminal does not detect a power saving signal, or the terminal detects a power saving signal and the power saving signal does not indicate the terminal to monitor the physical downlink control channel within the onduration.

Figure 15:
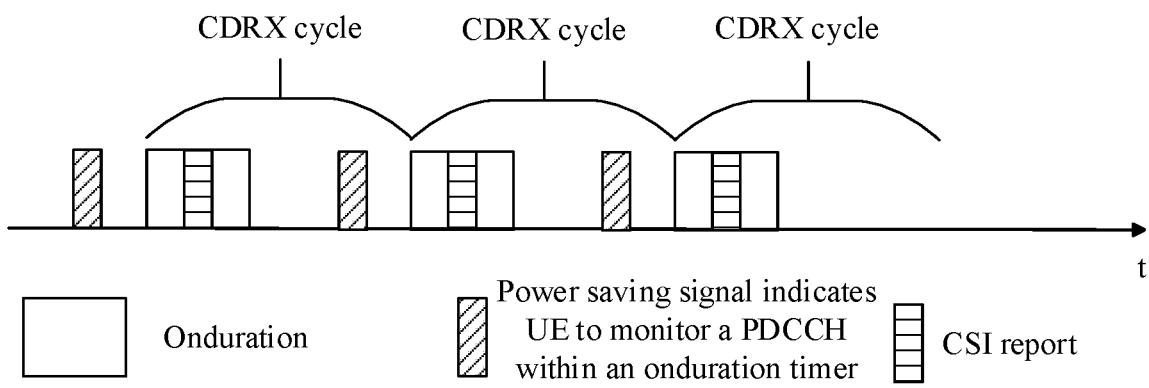
FIG. 15 is a second schematic diagram of CSI report time according to an embodiment of this disclosure.

A specific manner is as follows: If report time of the report configuration of the second channel state information is within the connected mode discontinuous reception active time, the channel state information is reported based on the report configuration of the second channel state information. As shown in FIG. 15, the report time of the report configuration of the second channel state information is within the onduration.

Optionally, if the report time of the report configuration of the second channel state information is outside the connected mode discontinuous reception active time, the channel state information can be reported outside the connected mode discontinuous reception active time based on the report configuration of the second channel state information.

Optionally, if the report time of the report configuration of the first channel state information is within the connected mode discontinuous reception active time, the channel state information can be reported within the connected mode discontinuous reception active time based on the report configuration of the first channel state information.

In some implementations, the report configuration of the first channel state information includes one or more of the following:
 (1) a first parameter, where the first parameter represents a report cycle of the first channel state information. For example, the report cycle is 10 slots.
 (2) a second parameter, where the second parameter represents a report quantity of the first channel state information. The channel state information report quantity includes: reference signal received power of a channel state information reference signal resource indicator (CRI-RSRP), reference signal received power of a synchronization signal and PBCH block (ssb-Index-RSRP), channel state information reference signal resource indicator-rank indicator-precoding matrix indicator-channel quality indicator (cri-RI-PMI-CQI), channel state information reference signal resource indicator-rank indicator-i1 (cri-RI-i1), channel state information reference signal resource indicator-rank indicator-i1-channel quality indicator (cri-RI-i1-CQI), channel state information reference signal resource indicator-rank indicator-channel quality indicator (cri-RI-CQI), and channel state information reference signal resource indicator-rank indicator-layer indicator-precoding matrix indicator-channel quality indicator (cri-RI-LI-PMI-CQI).
 (3) a third parameter, where the third parameter represents a report configuration type (reportConfigType) of the first channel state information. Channel state information report configuration types include: periodic, semi-persistent, and aperiodic.
 (4) a fourth parameter, where the fourth parameter represents a reference signal resource associated with reporting of the first channel state information. The reference signal resource includes a CSI-RS resource used for channel measurement and a CSI-RS resource used for interference measurement.

In some implementations, the report configuration of the second channel state information includes one or more of the following:
(1) a fifth parameter, where the fifth parameter represents a report cycle of the second channel state information. For example, the report cycle is 10 slots.
(2) a sixth parameter, where the sixth parameter represents a report quantity of the second channel state information. The channel state information report quantity includes: reference signal received power of a channel state information reference signal resource indicator (CRI-RSRP), reference signal received power of a synchronization signal and PBCH block (ssb-Index-RSRP), channel state information reference signal resource indicator-rank indicator-precoding matrix indicator-channel quality indicator (cri-RI-PMI-CQI), channel state information reference signal resource indicator-rank indicator-i1 (cri-RI-i1), channel state information reference signal resource indicator-rank indicator-i1-channel quality indicator (cri-RI-i1-CQI), channel state information reference signal resource indicator-rank indicator-channel quality indicator (cri-RI-CQI), and channel state information reference signal resource indicator-rank indicator-layer indicator-precoding matrix indicator-channel quality indicator (cri-RI-LI-PMI-CQI).
(3) a seventh parameter, where the seventh parameter represents a report configuration type of the second channel state information Channel state information report configuration types include: periodic, semi-persistent, and aperiodic.
(4) an eighth parameter, where the eighth parameter represents a reference signal resource associated with reporting of the second channel state information. The reference signal resource includes a CSI-RS resource used for channel measurement and a CSI-RS resource used for interference measurement.

In some implementations, the report cycle of the first channel state information is longer than the report cycle of the second channel state information; and/or report quantity types of the first channel state information are fewer than report quantity types of the second channel state information.

In some implementations, the report quantity of the first channel state information includes one or more of the following: (1) CSI-RSRP; and (2) ssb-Index-RSRP.

In this embodiment of this disclosure, channel state information reporting is performed outside the active time. This avoids a possible resulting problem of terminal beam or link failure when the terminal cannot report channel state information for a long time after the power saving signal is configured, thereby improving reliability of uplink transmission.

Figure 5:
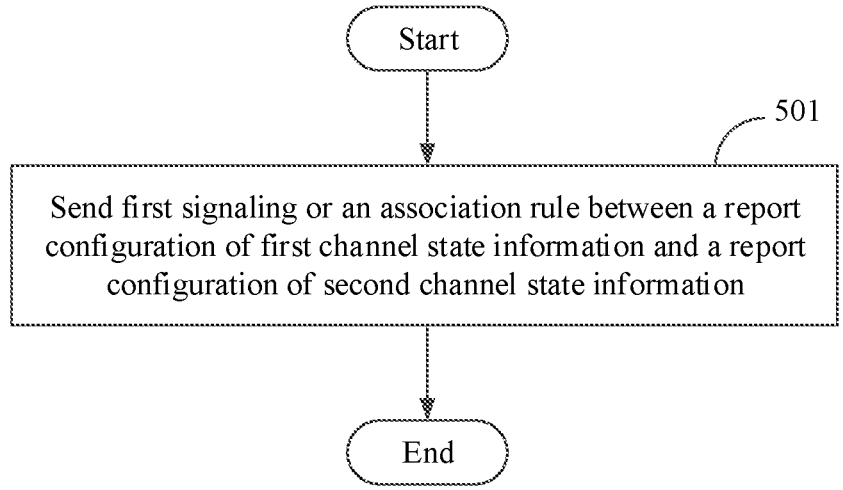
FIG. 5 is a second flowchart of a processing method according to an embodiment of this disclosure.

Referring to FIG. 5, an embodiment of this disclosure further provides a processing method. The method is executed by a network device and includes step 501.

Step 501: Send first signaling or an association rule between a report configuration of first channel state information and a report configuration of second channel state information.

The first signaling indicates the report configuration of the first channel state information configured by a network side, and the report configuration of the first channel state information is used for reporting channel state information when a terminal is not indicated to monitor a physical downlink control channel within onduration.

In some implementations, the method further includes: sending the report configuration of the second channel state information, where the report configuration of the second channel state information is used for reporting channel state information when the terminal is indicated to monitor the physical downlink control channel within the onduration.

Further, the association rule represents a correspondence relationship between the report configuration of the first channel state information and the report configuration of the second channel state information, and the association rule may be defined by a protocol or configured by the network side.

Optionally, the association rule may include one or more of the following: (1) a report cycle of the first channel state information is N times a report cycle of the second channel state information, where N is a positive integer; and (2) a report quantity type of the first channel state information. For example, the terminal may skip some unimportant channel state information report quantities. For example, the terminal may skip a channel state information report quantity other than cri-RSRP and ssb-Index-RSRP.

In some implementations, the report configuration of the first channel state information includes one or more of the following:
(1) a first parameter, where the first parameter represents a report cycle of the first channel state information;
(2) a second parameter, where the second parameter represents a report quantity (reportQuantity) of the first channel state information;
(3) a third parameter, where the third parameter represents a report configuration type (reportConfigType) of the first channel state information; and
(4) a fourth parameter, where the fourth parameter represents a reference signal resource associated with reporting of the first channel state information.

In some implementations, the report configuration of the second channel state information includes one or more of the following:
(1) a fifth parameter, where the fifth parameter represents a report cycle of the second channel state information;
(2) a sixth parameter, where the sixth parameter represents a report quantity of the second channel state information;
(3) a seventh parameter, where the seventh parameter represents a report configuration type of the second channel state information; and
(4) an eighth parameter, where the eighth parameter represents a reference signal resource associated with reporting of the second channel state information.

In some implementations, the report cycle of the first channel state information is longer than the report cycle of the second channel state information; and/or report quantity types of the first channel state information are fewer than report quantity types of the second channel state information.

In some implementations, the report quantity of the first channel state information includes one or more of the following: (1) CSI-RSRP; and (2) ssb-Index-RSRP.

In this embodiment of this disclosure, channel state information reporting is performed outside the active time. This avoids a possible resulting problem of terminal beam or link failure when the terminal cannot report channel state information for a long time after the power saving signal is configured, thereby improving reliability of uplink transmission.

Figure 6:
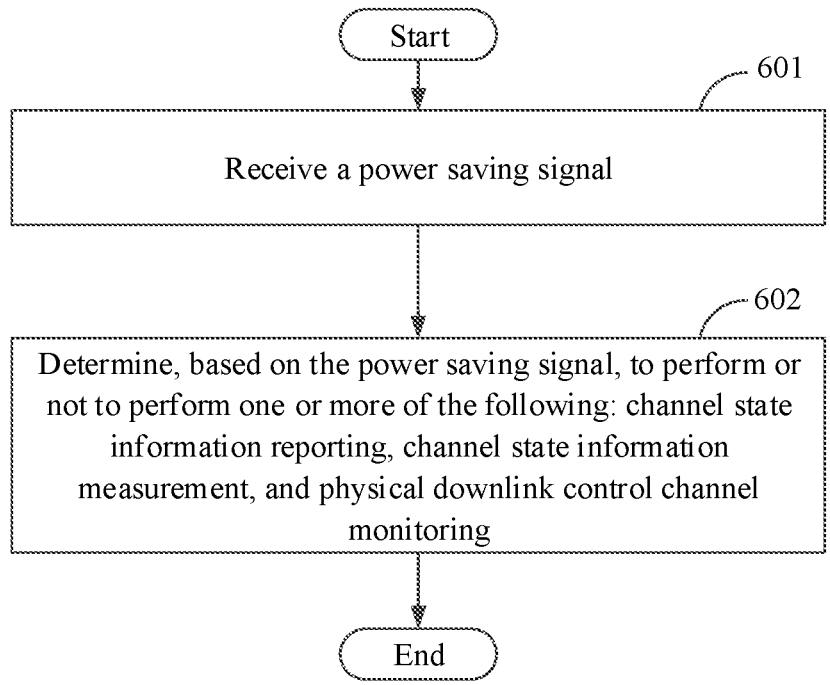
FIG. 6 is a third flowchart of a processing method according to an embodiment of this disclosure.

Referring to FIG. 6, an embodiment of this disclosure further provides a processing method. The method is executed by a terminal and includes step 601 and step 602.

Step 601: Receive a power saving signal, where the power saving signal indicates any one of the following: (1) a terminal is to perform channel state information reporting and not to perform physical downlink control channel monitoring; (2) the terminal is to perform channel state information reporting and physical downlink control channel monitoring; (3) the terminal is not to perform channel state information reporting and is to perform physical downlink control channel monitoring; and (4) the terminal is not to perform channel state information reporting or physical downlink control channel monitoring.

Step 602: Determine, based on the power saving signal, to perform or not to perform one or more of the following: (1) channel state information reporting; and (2) physical downlink control channel reporting.

In some implementations, channel state information report time is within a connected mode discontinuous reception cycle associated with the power saving signal, or the channel state information report time is before the connected mode discontinuous reception onduration associated with the power saving signal.

In some implementations, when the power saving signal indicates the terminal to perform channel state information reporting, the method further includes: performing channel state information reporting based on a report configuration of third channel state information configured by a network side.

It can be understood that the report configuration of the third channel state information may be a periodic channel state information report configuration. For a report cycle, report quantity, and report configuration type in the report configuration of the third channel state information, configurations in the related art may be used, and details are not described herein.

In this embodiment of this disclosure, the power saving signal is used to indicate channel state information reporting and physical downlink control channel monitoring. This avoids a possible resulting problem of terminal beam or link failure when the terminal cannot report channel state information for a long time after the power saving signal is configured, thereby improving reliability of uplink transmission.

Figure 7:
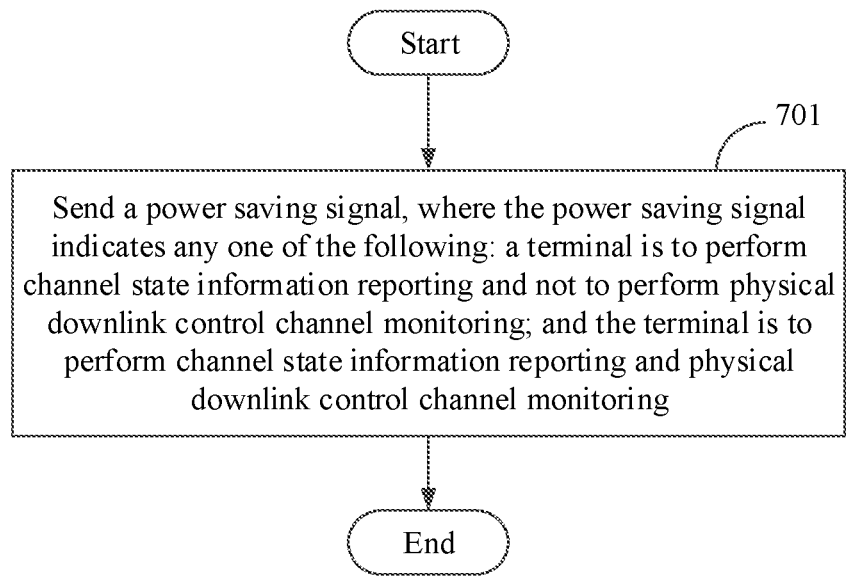
FIG. 7 is a fourth flowchart of a processing method according to an embodiment of this disclosure.

Referring to FIG. 7, an embodiment of this disclosure further provides a processing method. The method is executed by a network device and includes step 701.

Step 701: Send a power saving signal, where the power saving signal indicates any one of the following: (1) a terminal is to perform channel state information reporting and not to perform physical downlink control channel monitoring; (2) the terminal is to perform channel state information reporting and physical downlink control channel monitoring; (3) the terminal is not to perform channel state information reporting and is to perform physical downlink control channel monitoring; and (4) the terminal is not to perform channel state information reporting or physical downlink control channel monitoring.

In some implementations, channel state information report time is within a connected mode discontinuous reception cycle associated with the power saving signal, or the channel state information report time is before the connected mode discontinuous reception onduration associated with the power saving signal.

In this embodiment of this disclosure, the power saving signal is used to indicate channel state information reporting and physical downlink control channel monitoring. This avoids a possible resulting problem of terminal beam or link failure when the terminal cannot report channel state information for a long time after the power saving signal is configured, thereby improving reliability of uplink transmission.

The following describes the embodiments of this disclosure with reference to Example 1, Example 2, Example 3, and Example 4.

Example 1

A new channel state information report configuration (CSI-ReportConfig) outside active time is configured for UE, and the UE reports CSI only outside the active time.

For example, a new CSI-ReportConfig is configured for the UE. The CSI-Report is only outside the active time. The CSI-ReportConfig includes at least the following parameters:
(1) reportConfigType that indicates a CSI report cycle.
(2) reportQuantity that indicates a CSI report quantity type, such as cri-RI-PMI-CQI and cri-RSRP.

Example 2

A CSI report outside active time has association information (or referred to as a first rule) with a CSI report within the active time, and the UE reports the CSI only outside the active time.

In this example, no specific CSI-ReportConfig outside the active time is configured, but the association information is defined.

For example, the association information may include: (1) a cycle of CSI-Report outside the active time is N times a cycle of configured CSI-Report within the active time, where N is a positive integer; and/or (2) the UE skips some unimportant CSI reports. For example, the UE skips a CSI report other than cri-RSRP and ssb-Index-RSRP.

For example, the cycle of the CSI-Report outside the active time configured for the UE is greater than the cycle of the configured CSI-Report within the active time.

For another example, the CSI-Report quantity outside the active time configured for the UE includes only cri-RSRP and/or ssb-Index-RSRP, while the configured CSI-Report quantity within the active time includes more items.

Example 3

A power saving signal is used to indicate the UE to perform CSI reporting.

The power saving signal indicates the UE to perform any one of the following:
(1) Perform CSI reporting only, but skip performing PDCCH monitoring;
(2) Perform CSI reporting and PDCCH monitoring;
(3) Skip performing CSI reporting, but perform PDCCH monitoring; and
(4) Skip performing CSI reporting and PDCCH monitoring.

Optionally, a time domain resource for CSI reporting may be: (1) only within the active time such as onduration (onduration timer); (2) only outside the active time.

The UE determines, based on indication of the power saving signal, to perform or not to perform CSI reporting and/or PDCCH monitoring.

For example, when a network wants to trigger CSI reporting, but in order to maintain beam accuracy only, expects no PDCCH monitoring in a next DRX onduration, the power saving signal may carry indication that indicates the UE only to perform CSI reporting but no PDCCH monitoring.

Example 4

CSI reporting within the active time is reduced.

CSI reporting within the active time is reduced, for example, a report cycle is increased and reporting content is reduced.

For example, a base station configures two sets of CSI report configurations for the UE. The first set has a longer report cycle than the second set, and/or the first set has fewer report quantity types than the second set. For example, the report quantity (reportQuantity) in the first set only includes cri-RSRP and/or ssb-Index-RSRP. When the UE detects the power saving signal that indicates the UE to monitor a PDCCH within onduration, the UE performs CSI reporting based on the second set of CSI report configuration; otherwise, the UE performs CSI reporting based on the first set of CSI report configuration.

It should be noted that in the foregoing Example 1 to Example 4:
(1) A CSI resource configuration (ResourceConfig) includes only a non-zero power CSI-RS (NZP-CSI-RS) resource and/or a synchronization signal and PBCH block (SSB) resource.
(2) CSI reporting may be extended as CSI reporting and/or CSI measurement such as beam measurement.
(3) The active time refers to DRX active time.

An embodiment of this disclosure further provides a terminal. Because a problem-resolving principle of the terminal is similar to that of the processing method in the embodiments of this disclosure, for implementation of the terminal, reference may be made to the implementation of the method. Details are not described herein again.

Figure 8:
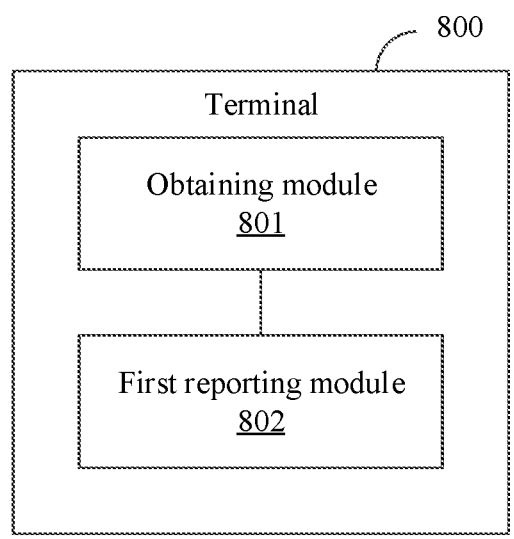
FIG. 8 is a first structural diagram of a terminal according to an embodiment of this disclosure.

Referring to FIG. 8, an embodiment of this disclosure further provides a terminal. The terminal 800 includes:
an obtaining module 801, configured to obtain a report configuration of first channel state information; and
a first reporting module 802, configured to, if the terminal is not indicated to monitor a physical downlink control channel within onduration, report channel state information based on the report configuration of the first channel state information.

In some implementations, the terminal 800 further includes:
a first receiving module, configured to receive a report configuration of second channel state information configured by a network side; and
a second reporting module, configured to, if the terminal is indicated to monitor a physical downlink control channel within onduration, report channel state information based on the report configuration of the second channel state information.

In some implementations, the first reporting module 802 is further configured to: if report time of the report configuration of the first channel state information is outside connected mode discontinuous reception active time, report the channel state information based on the report configuration of the first channel state information.

In some implementations, the second reporting module is further configured to: if report time of the report configuration of the second channel state information is within the connected mode discontinuous reception active time, report the channel state information based on the report configuration of the second channel state information.

In some implementations, the obtaining module 801 is further configured to: receive first signaling, where the first signaling indicates the report configuration of the first channel state information configured by the network side, and the report configuration of the first channel state information indicates that report time of the first channel state information is outside the connected mode discontinuous reception active time.

In some implementations, the obtaining module 801 is further configured to: determine the report configuration of the first channel state information based on the report configuration of the second channel state information and an association rule, where the association rule represents a correspondence relationship between the report configuration of the first channel state information and the report configuration of the second channel state information, and the association rule is defined by a protocol or configured by the network side.

In some implementations, the association rule includes one or more of the following:
a report cycle of the first channel state information is N times a report cycle of the second channel state information, where N is a positive integer; and
a report quantity type of the first channel state information.

In some implementations, the report configuration of the first channel state information includes one or more of the following:
a first parameter, where the first parameter represents a report cycle of the first channel state information;
a second parameter, where the second parameter represents a report quantity of the first channel state information;
a third parameter, where the third parameter represents a report configuration type of the first channel state information; and
a fourth parameter, where the fourth parameter represents a reference signal resource associated with reporting of the first channel state information.

In some implementations, the report configuration of the second channel state information includes one or more of the following:
a fifth parameter, where the fifth parameter represents a report cycle of the second channel state information;
a sixth parameter, where the sixth parameter represents a report quantity of the second channel state information;
a seventh parameter, where the seventh parameter represents a report configuration type of the second channel state information; and
an eighth parameter, where the eighth parameter represents a reference signal resource associated with reporting of the second channel state information.

In some implementations, the report cycle of the first channel state information is longer than the report cycle of the second channel state information; and/or report quantity types of the first channel state information are fewer than report quantity types of the second channel state information.

In some implementations, the report quantity of the first channel state information includes one or more of the following: reference signal received power of a channel state information reference signal resource indicator; and reference signal received power of a synchronization signal and PBCH block.

The terminal provided in this embodiment of this disclosure can execute the embodiment shown in FIG. 4, and implementation principles and technical effects thereof are similar. Details are not described herein again.

An embodiment of this disclosure further provides a network device. Because a problem-resolving principle of the network device is similar to that of the processing method in the embodiments of this disclosure, for implementation of the network device, reference may be made to the implementation of the method. Details are not described herein again.

Figure 9:
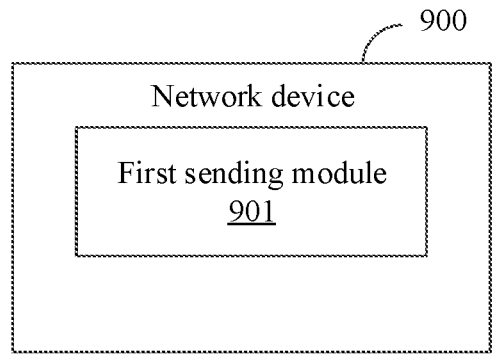
FIG. 9 is a first structural diagram of a network device according to an embodiment of this disclosure.

Referring to FIG. 9, an embodiment of this disclosure further provides a network device. The network device 900 includes:
- a first sending module 901, configured to send first signaling or an association rule between a report configuration of first channel state information and a report configuration of second channel state information, where
- the first signaling indicates the report configuration of the first channel state information configured by a network side, and the report configuration of the first channel state information is used for reporting channel state information when a terminal is not indicated to monitor a physical downlink control channel within onduration.

In some implementations, the first sending module 901 is further configured to: send the report configuration of the second channel state information, where the report configuration of the second channel state information is used for reporting channel state information when the terminal is indicated to monitor the physical downlink control channel within the onduration.

In some implementations, the association rule includes one or more of the following:
- a report cycle of the first channel state information is N times a report cycle of the second channel state information, where N is a positive integer; and
- a report quantity type of the first channel state information.

In some implementations, the report configuration of the first channel state information includes one or more of the following:
- a first parameter, where the first parameter represents a report cycle of the first channel state information;
- a second parameter, where the second parameter represents a report quantity of the first channel state information;
- a third parameter, where the third parameter represents a report configuration type of the first channel state information; and
- a fourth parameter, where the fourth parameter represents a reference signal resource associated with reporting of the first channel state information.

In some implementations, the report configuration of the second channel state information includes one or more of the following:
- a fifth parameter, where the fifth parameter represents a report cycle of the second channel state information;
- a sixth parameter, where the sixth parameter represents a report quantity of the second channel state information;
- a seventh parameter, where the seventh parameter represents a report configuration type of the second channel state information; and
- an eighth parameter, where the eighth parameter represents a reference signal resource associated with reporting of the second channel state information.

In some implementations, the report cycle of the first channel state information is longer than the report cycle of the second channel state information; and/or report quantity types of the first channel state information are fewer than report quantity types of the second channel state information.

In some implementations, the report quantity of the first channel state information includes one or more of the following: reference signal received power of a channel state information reference signal resource indicator; and reference signal received power of a synchronization signal and PBCH block.

The network device provided in this embodiment of this disclosure can execute the embodiment shown in FIG. 5, and implementation principles and technical effects thereof are similar. Details are not described herein again.

An embodiment of this disclosure further provides a terminal. Because a problem-resolving principle of the terminal is similar to that of the processing method in the embodiments of this disclosure, for implementation of the terminal, reference may be made to the implementation of the method. Details are not described herein again.

Figure 10:
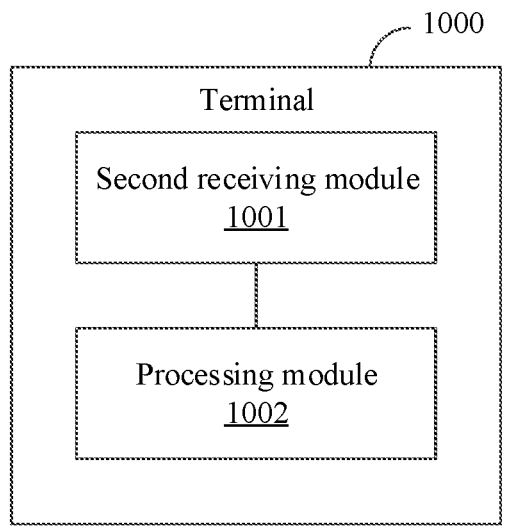
FIG. 10 is a second structural diagram of a terminal according to an embodiment of this disclosure.

Referring to FIG. 10, an embodiment of this disclosure further provides a terminal. The terminal 1000 includes:
- a second receiving module 1001, configured to receive a power saving signal, where the power saving signal indicates any one of the following: the terminal is to perform channel state information reporting and not to perform physical downlink control channel monitoring; the terminal is to perform channel state information reporting and physical downlink control channel monitoring; the terminal is not to perform channel state information reporting and is to perform physical downlink control channel monitoring; and the terminal is not to perform channel state information reporting or physical downlink control channel monitoring; and
- a processing module 1002, configured to determine, based on the power saving signal, to perform or not to perform one or more of the following: channel state information reporting; and physical downlink control channel monitoring.

In some implementations, report time of the channel state information is within a connected mode discontinuous reception cycle associated with the power saving signal; or report time of the channel state information is before connected mode discontinuous reception onduration associated with the power saving signal.

In some implementations, the terminal 1000 further includes: a third reporting module, configured to, when the power saving signal indicates the terminal to perform channel state information reporting, report the channel state information based on a report configuration of third channel state information configured by a network side.

The terminal provided in this embodiment of this disclosure can execute the embodiment shown in FIG. 6, and implementation principles and technical effects thereof are similar. Details are not described in this embodiment again.

An embodiment of this disclosure further provides a network device. Because a problem-resolving principle of the network device is similar to that of the processing method in the embodiments of this disclosure, for implementation of the network device, reference may be made to the implementation of the method. Details are not described herein again.

Figure 11:
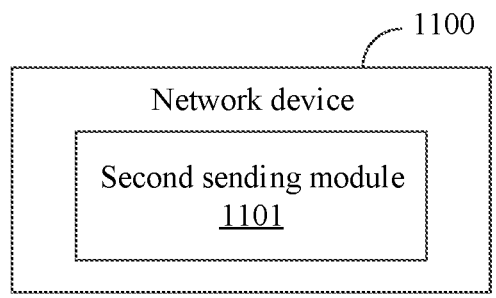
FIG. 11 is a second structural diagram of a network device according to an embodiment of this disclosure.

Referring to FIG. 11, an embodiment of this disclosure further provides a network device. The network device 1100 includes:

a second sending module 1101, configured to send a power saving signal, where the power saving signal indicates any one of the following: a terminal is to perform channel state information reporting and not to perform physical downlink control channel monitoring; the terminal is to perform channel state information reporting and physical downlink control channel monitoring; the terminal is not to perform channel state information reporting and is to perform physical downlink control channel monitoring; and the terminal is not to perform channel state information reporting or physical downlink control channel monitoring.

In some implementations, report time of the channel state information is within a connected mode discontinuous reception cycle associated with the power saving signal; or report time of the channel state information is before connected mode discontinuous reception onduration associated with the power saving signal.

The network device provided in this embodiment of this disclosure can execute the embodiment shown in FIG. 7, and implementation principles and technical effects thereof are similar. Details are not described in this embodiment again.

Figure 12:
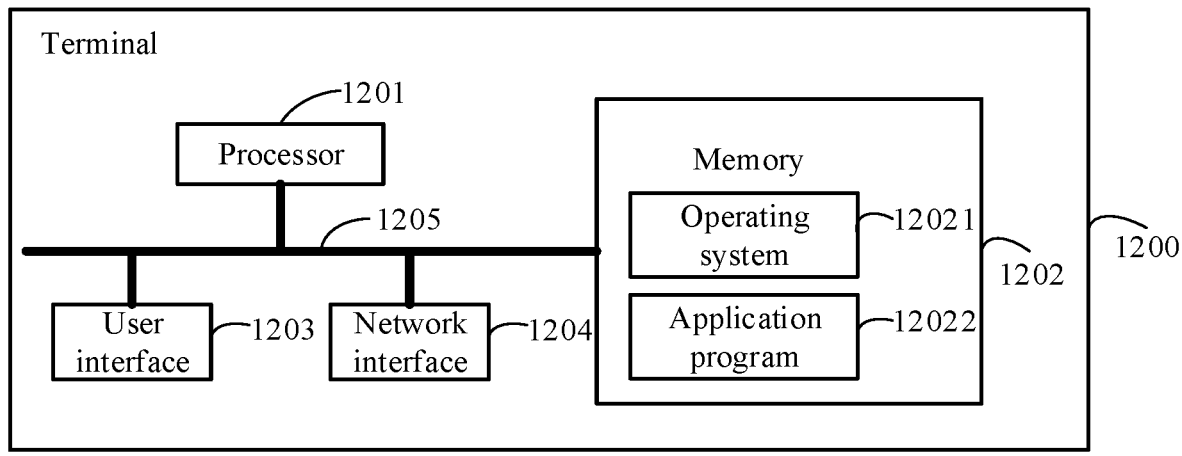
FIG. 12 is a third structural diagram of a terminal according to an embodiment of this disclosure.

As shown in FIG. 12, a terminal 1200 shown in FIG. 12 includes: at least one processor 1201, a memory 1202, at least one network interface 1204, and a user interface 1203. Components of the terminal 1200 are coupled together by using a bus system 1205. It can be understood that the bus system 1205 is configured to implement connection and communication between these components. In addition to a data bus, the bus system 1205 further includes a power bus, a control bus, and a status signal bus. However, for clarity of description, various buses are marked as the bus system 1205 in FIG. 12.

The user interface 1203 may include a display, a keyboard, or a pointing device (for example, a mouse, a trackball, a touch panel, or a touchscreen).

It can be understood that the memory 1202 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1202 of the system and the method described in the embodiments of this disclosure is intended to include but not limited to these and any other applicable types of memories.

In some embodiments, the memory 1202 stores the following elements: executable modules or data structures, or a subset thereof, or an extended set thereof: an operating system 12021 and an application program 12022.

The operating system 12021 includes various system programs, such as a framework layer, a core library layer, and a driver layer, for implementing various basic services and processing hardware-based tasks. The application program 12022 includes various application programs, such as a media player and a browser, which are used to implement various application services. A program for implementing the method in the embodiments of this disclosure may be included in the application program 12022.

In an embodiment of this disclosure, when a program or an instruction stored in the memory 1202, which may be specifically a program or an instruction stored in the application program 12022, is executed through invocation, the steps of the method shown in FIG. 4 or FIG. 6 are implemented.

The terminal provided in this embodiment of this disclosure can execute the processing method embodiments, and implementation principles and technical effects thereof are similar. Details are not described in this embodiment again.

Figure 13:
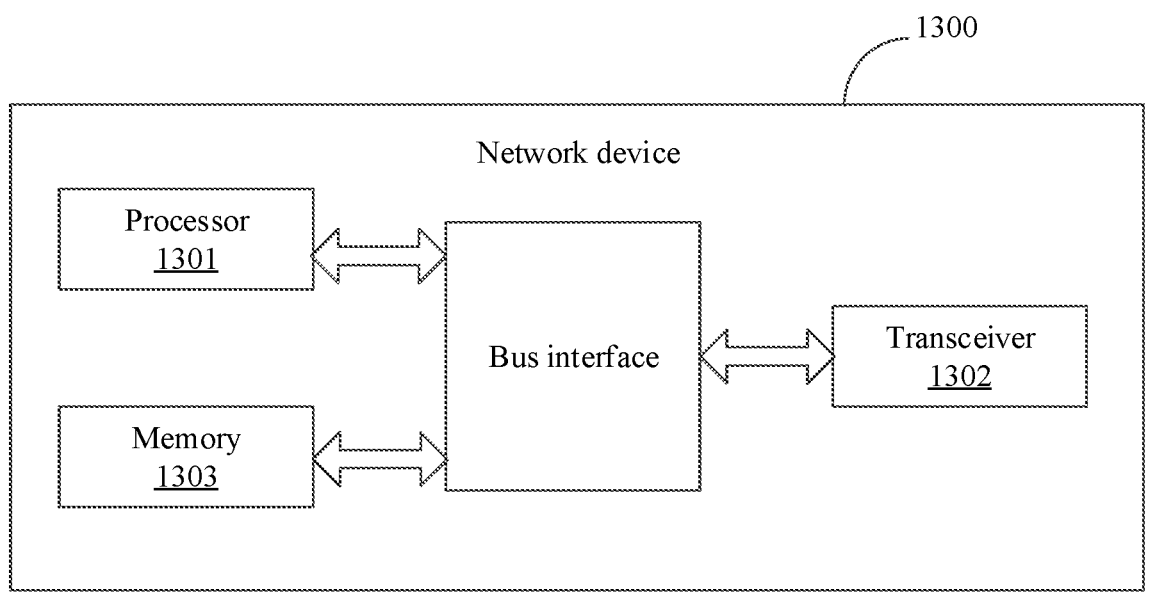
FIG. 13 is a third structural diagram of a network device according to an embodiment of this disclosure.

Referring to FIG. 13, FIG. 13 is a structural diagram of a network device to which an embodiment of this disclosure is applied. As shown in FIG. 13, the network device 1300 includes a processor 1301, a transceiver 1302, a memory 1303, and a bus interface. The processor 1301 is responsible for management of the bus architecture and general processing. The memory 1303 may store data for use by the processor 1301 when performing an operation.

In an embodiment of this disclosure, the network device 1300 further includes a computer program stored in the memory 1303 and capable of running on the processor 1301. When the computer program is executed by the processor 1301, the steps of the method shown in FIG. 5 or FIG. 7 are implemented.

In FIG. 13, a bus architecture may include any quantity of interconnected buses and bridges, and specifically connect together various circuits of one or more processors represented by the processor 1301 and a memory represented by the memory 1303. The bus architecture may further interconnect various other circuits such as a peripheral device, a voltage regulator, and a power management circuit. These are all well known in the art, and therefore are not further described in this specification. The bus interface provides an interface. The transceiver 1302 may be a plurality of components, including a transmitter and a receiver, and provides units for communicating with a variety of other apparatuses on a transmission medium.

The network device provided in this embodiment of this disclosure can execute the processing method embodiments, and implementation principles and technical effects thereof are similar. Details are not described in this embodiment again.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist in the core network interface device as discrete components.

A person of skill in the art should be able to realize that in one or more of the foregoing examples, the functions described in this disclosure may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this disclosure are further described in detail in the foregoing specific embodiments. It should be understood that the foregoing descriptions are only specific embodiments of this disclosure, but are not intended to limit the protection scope of this disclosure. Any modification, equivalent replacement, or improvement made within the spirit and principle of this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this disclosure without departing from the spirit and scope of this disclosure. This disclosure is intended to cover these modifications and variations provided that the modifications and variations in the embodiments of this disclosure fall within the protection scope defined by the following claims and their equivalent technologies.

What is claimed is:

1. A processing method, applied to a terminal and comprising:
   receiving a power saving signal; and
   reporting channel state information when the power saving signal indicates not to perform physical downlink control channel monitoring;
   wherein the power saving signal indicating not to perform physical downlink control channel monitoring is not to perform physical downlink control channel monitoring within an onduration of a Discontinuous Reception (DRX) cycle;
   a report configuration of the channel state information is a periodic channel state information report configuration, and the reporting channel state information further comprises:
   reporting the channel state information, based on the report configuration of channel state information configured by a network side.

2. The method according to claim 1, wherein
   report time of the channel state information is within a connected mode discontinuous reception cycle associated with the power saving signal; or
   report time of the channel state information is before connected mode discontinuous reception onduration associated with the power saving signal.

3. The method according to claim 1, wherein the report configuration of the channel state information comprises one or more of the following:
   a first parameter, wherein the first parameter represents a report cycle of the channel state information;
   a second parameter, wherein the second parameter represents a report quantity of the channel state information;
   a third parameter, wherein the third parameter represents a report configuration type of the channel state information; and
   a fourth parameter, wherein the fourth parameter represents a reference signal resource associated with reporting of the channel state information.

4. The method according to claim 3, wherein the report quantity of the channel state information comprises one or more of the following:
   reference signal received power of a channel state information reference signal resource indicator; and
   reference signal received power of a synchronization signal and PBCH block.

5. A terminal, comprising a processor, a memory, and a program stored in the memory and capable of running on the processor, wherein when the program is executed by the processor, the following steps are implemented:
   receiving a power saving signal; and
   reporting channel state information when the power saving signal indicates not to perform physical downlink control channel monitoring;
   wherein the power saving signal indicating not to perform physical downlink control channel monitoring is not to perform physical downlink control channel monitoring within an onduration of a Discontinuous Reception (DRX) cycle;

a report configuration of the channel state information is a periodic channel state information report configuration;

when the program is executed by the processor, the following step is further implemented:

reporting the channel state information based on the report configuration of channel state information configured by a network side.

6. The terminal according to claim 5, wherein report time of the channel state information is within a connected mode discontinuous reception cycle associated with the power saving signal; or report time of the channel state information is before connected mode discontinuous reception onduration associated with the power saving signal.

7. The terminal according to claim 5, wherein the report configuration of the channel state information comprises one or more of the following:

a first parameter, wherein the first parameter represents a report cycle of the channel state information;

a second parameter, wherein the second parameter represents a report quantity of the channel state information;

a third parameter, wherein the third parameter represents a report configuration type of the channel state information; and a fourth parameter, wherein the fourth parameter represents a reference signal resource associated with reporting of the channel state information.

8. The terminal according to claim 7, wherein the report quantity of the channel state information comprises one or more of the following:

reference signal received power of a channel state information reference signal resource indicator; and reference signal received power of a synchronization signal and PBCH block.

9. A non-transitory computer-readable storage medium, wherein a computer program is stored in the computer-readable storage medium, and when the computer program is executed by a processor, the following steps are implemented:

receiving a power saving signal; and reporting channel state information when the power saving signal indicates not to perform physical downlink control channel monitoring;

wherein the power saving signal indicating not to perform physical downlink control channel monitoring is not to perform physical downlink control channel monitoring within an onduration of a Discontinuous Reception (DRX) cycle;

a report configuration of the channel state information is a periodic channel state information report configuration;

when the computer program is executed by a processor, the following step is further implemented:

reporting the channel state information based on the report configuration of channel state information configured by a network side.

10. The non-transitory computer-readable storage medium according to claim 9, wherein report time of the channel state information is within a connected mode discontinuous reception cycle associated with the power saving signal; or report time of the channel state information is before connected mode discontinuous reception onduration associated with the power saving signal.

11. The non-transitory computer-readable storage medium according to claim 9, wherein the report configuration of the channel state information comprises one or more of the following:

a first parameter, wherein the first parameter represents a report cycle of the channel state information;

a second parameter, wherein the second parameter represents a report quantity of the channel state information;

a third parameter, wherein the third parameter represents a report configuration type of the channel state information; and a fourth parameter, wherein the fourth parameter represents a reference signal resource associated with reporting of the channel state information.

12. The non-transitory computer-readable storage medium according to claim 11, wherein the report quantity of the channel state information comprises one or more of the following:

reference signal received power of a channel state information reference signal resource indicator; and reference signal received power of a synchronization signal and PBCH block.

* * * * *